Patented Mar. 10, 1942

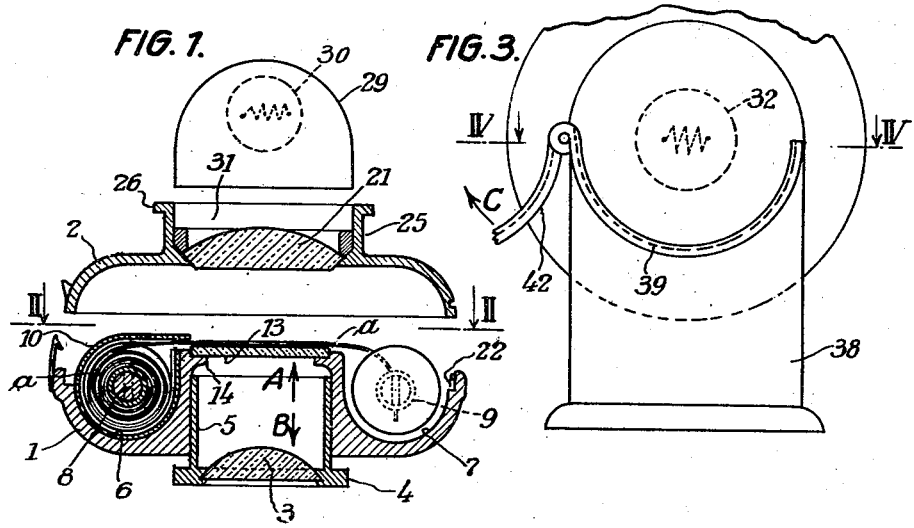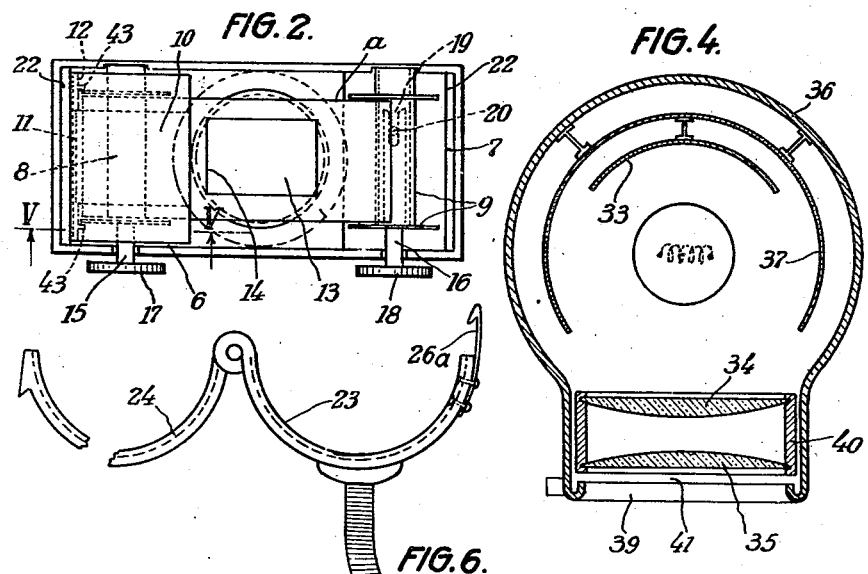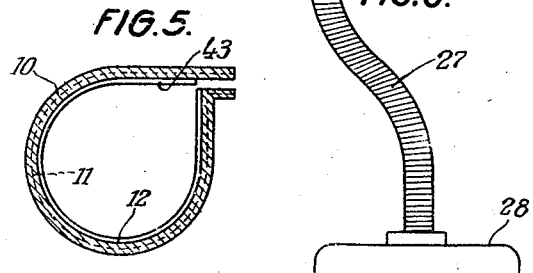

2,275,863

UNITED STATES PATENT OFFICE 2,275,863

PHOTO VIEWER AND PROJECTOR

Curt Rauch, Chemnitz, Germany

Application July 9, 1938, Serial No. 218,398
In Germany July 10, 1937

6 Claims. (Cl. 88—28)

An amateur photographer usually wishes to show to his friends and acquaintances his photos, which are of interest to such persons especially if their image appears on the photos. It was very simple to show photos without damaging them, as long as it was the question of copies on paper which could easily be carried in the pocket and shown round. If a color film is viewed in the above mentioned manner the necessary handling thereof results in injury and ultimate destruction of the film. This is due to the fact that the material of the color film is not as durable and wear-resisting as the usual copies, and is very sensitive to scratching, dust and finger marks. Furthermore, it cannot be replaced. In addition, small pictures require magnifying. For this purpose, photo viewing instruments with magnifying lenses have been created, where the ends of the film usually hang down on both sides, the film being touched with the fingers in order to draw it through the instrument. Some viewing instruments have also been described in pamphlets, where the film is held by spools, but those instruments are not handy enough to be carried in the pocket. In any case, it was necessary to carry the film loosely or in a protective case without a slot, so that the film had to be taken out of this case and to be put onto the spools of the viewer. It is nearly always desired to see the photos in the order in which they were taken. As is known, it is recommended by film manufacturers, by sellers of photographic materials, and in the respective literature, to cut off the pictures and to place them singly between protective glass plates. Undoubtedly, this protection is very good but it is difficult to carry such pictures in the pocket, as the protective glass is very heavy and takes up much room.

The photo viewer according to the invention avoids all these disadvantages in the first place by winding the ready films onto spools and attaching the end of the film with the last photo to the spool. The spools with the films may also be covered by a protective case with a slot at the side through which the commencement of the film looks out, the case being held by a slight narrowing which bears against the flange of the inserted spool. In a modified construction the spools are left away and only laterally slotted cases are used if the film is not to be moved by turning the spools but, for example, by means of friction wheels or toothed wheels engaging in the perforation at the edges of the film. However, with longer films this is not advisable, as the tendency of the film to roll together is hardly sufficient and also leaves off very soon, or it would only be possible with cases of excessive diameters when the viewer is also used as a projector, as will be explained below. These protective cases, which should be dustproof but need not keep off the light and can therefore be made of a cheap moulding material, transparent if desired, may be shaped similar to the cases used for unexposed films. Thus, the films are already protected by the developing photographer in the same way as when the films are cut and the individual photos are placed between glass plates. The well protected films are so inserted in the viewing instrument.

An embodiment of the invention is illustrated by way of example in the accompanying drawing, in which:

Fig. 1 is a longitudinal section through the three principal parts of the invention (all three spaced a little from each other), Fig. 2 is a top view in the direction of the arrows II—II of Fig. 1 showing a part of Fig. 1, Fig. 3 is a source of light to be used in connection with the article illustrated in Fig. 1, Fig. 4 is a section in the plane IV—IV of Fig. 3, Fig. 5 is a section in the plane V—V of Fig. 2 through a part in enlarged scale, and Fig. 6 is a side view of a part.

In the drawing 1 denotes the one shell and 2 the other shell of the viewer. The front shell 1 is provided with a lens 3. This is a magnifying lens, for example an aspherical lens, held in a frame 4 which is connected with a tube 5. By means of this tube the lens can be adjusted in the directions of the arrows A and B. On both sides of the lens in the shell 1 there are cylindrical spaces 6, 7 for the respective spools 8, 9. The two spools are similar to ordinary spools for films and can be arranged in the two spaces 6, 7. Preferably, one spool has a special protective case 10. The wall of this case has a thin portion 11 in the middle, and thicker portions 12 at the sides, which prevent the picture from touching the wall of the protective case when the film is moved, and projecting portions 43 preventing the film from sliding to the side. In this protective case is inserted a spool 8 with the film $a$ wound on. The film $a$ is absolutely protected in this protective case so that it cannot be touched with the fingers or scratched. There is a window, for example formed by a glass plate 13, the frame 14 of which bounds the picture. The film $a$ is guided past this window, only being touched at the edge and connected with the spool 9 as shown in Fig. 1. Rods 15, 16 project into the spools and are provided with turning means, for example knobs 17, 18, which for example have slots 19 engaging a pin 20 provided in such a spool. (Fig. 2.)

In the shell 2 there may be an interchangeable lens 21 concentrating, dispersing, or colouring the light coming in, so as to improve the appearance of the picture.

After inserting the spools 8, 9 or the protective case 10 in the shell 1, the shell 2 is put on, which for example fits into a corresponding recess 22 in the shell 1. (Figs. 1 and 2.) The two shells are held together by some means, resilient latches or the like. By turning the knob 18 it is possible to move the individual photos of the film into the window 13 and to look at them without any danger of damaging the very sensitive pictures in any way, as the films are only guided at the edge. When passing into the protective case, only the edges of the film glide over the thickened portion 12 at the sides of the case, whereas the centre portion of the film, bearing the actual picture, is completely free so that the picture cannot be scratched.

If, when taking out a film, it is not desired to turn the film back onto the original spool 8, but to leave it on the other spool 9, a protective case similar to the protective case 10 may be inserted there, or this protective case may be passed over the spool 9 with the film, after this spool has been taken out.

As in the first place the viewers are to be suitable for carrying in the pocket, they have to be constructed so as to take up as little room as possible and to weight as little as possible. The lens as well as the knobs can be pushed right into the instrument, when the latter is not used, so that these parts cannot fall out or be moved too much. For example, the knobs can only be drawn our as far as the length of the neck and the wall of the shell permits.

In order not to have to hold the viewer in the hand, it is advantageous to provide a holding ring preferably consisting of two bow-shaped parts 23, 24 which are suitable to embrace a cylindrical portion 25 of the shell 2, where a flange 26 prevents the bows 23, 24 from coming off. In closed position, these bows are held together by a spring latch 26a. The parts 23, 24 are attached to a flexible support 27 with foot 28 which makes it possible to place the viewer in any desired position with regard to a source of light, to a light surface, for example a sheet of paper, or the like. It is possible to turn the viewer in the bows 23, 24 so that the respective picture (high or broad) can be looked at in the correct position.

For illuminating the film with artificial light, a reflector 29 with any desired source of light 30 is provided, its dimensions fitting to the opening 31 of the shell 2, and when pushed into this opening, the reflector is held by friction in the opening.

If several persons are to look at the pictures at the same time, a funnel, either solid or of the folding type, and having at its broad portion a screen of transparent material, is put on the objective tube. In this case, the picture is projected onto the screen.

The construction of the viewer according to the invention has another great advantage consisting in the possibility of using it for projecting more enlarged pictures (as a projector or enlarger). For this purpose, it is only necessary to use a stronger light instead of the weak light source 30, to arrange a concave mirror 33 behind the light, and preferably insert respective lenses 34 and 35. (Figs. 3 and 4.) The whole arrangement is contained in a housing 36, which also includes a heat insulating screen 37, in order to reduce the heat of the light source radiated onto the housing 36. The entire apparatus is attached to a socket or foot 38. At the front of the housing 36 a flange 39 is arranged, spaced from a ring 40, which for example carries the lenses 34, 35, in such a way that the flange 26 of the lid 2 can be inserted in the space 41 and can then be held on the housing by a bow 42 which is turned in the direction C and laid round the flange 26. In this way, a projector is formed, being arranged so that the flange 26 can turn in the space 41 for placing the individual photos in a high or broad position, as required.

What I claim is:

1. A picture viewer and projector, comprising in combination: two separable shells, two hollow spaces in one of the shells for receiving holding means for the picture band, a protective case for protecting a picture band holding means, inwardly projecting thickened ends on the protective case as gliding surfaces for the picture band, a transparent plate for guiding a picture band extending from one holding means to the other, an adjustable observation lens in aforesaid shell, a light aperture in the other shell appropriately provided with a lens, means for holding the two shells separably together, and means for winding the picture band from one holding means onto the other.

2. A picture viewer and projector, comprising in combination: two separable shells, two hollow spaces in one of the shells for receiving picture bands, a transparent plate for guiding a picture band extending from one holding means to the other, an adjustable observation lens in aforesaid shell, a light aperture in the other shell, appropriately provided with a lens, a cylindrical prolongation in this shell, a flange on this prolongation, bows fitting to this cylindrical prolongation and rotatably and appropriately separable holding the latter, a flexible support with a foot for carrying the bows, means for holding the two shells separably together, and means for winding the picture band from one holding means onto the other.

3. A picture viewer and projector, comprising in combination: two separable shells, two hollow spaces in one of the shells for receiving picture bands, a transparent plate for guiding a picture band extending from one spool to the other, an adjustable appropriately interchangeable optical means in aforesaid shell, a light aperture in the other shell, appropriately provided with interchangeable optical means, means for holding the two shells separably together, means for winding the picture band from one holding means onto the other, a flange on one of the shells, a housing with a powerful source of light, a reflector behind the source of light, lenses in front of the source of light, and a flange on the housing serving as bearing and attaching means for aforesaid flange on one of the shells.

4. Picture viewer and projector comprising two separably mounted shells, two hollow spaces in one of said shells for the reception of picture band holding means, a transparent plate for guiding a picture band from one holding means to the other, an adjustably mounted observation lens in the aforesaid shell, a light aperture in the other shell, having a lens, a prolongation of said shell, a reflector having a light source in said prolongation, means for separably holding both shells, and means for winding the picture band from one holding means onto the other.

5. A compact portable exhibitor for the display of individual pictures on a film band and adapted to be carried in the pocket of the user, said exhibitor comprising, in combination, a housing formed of two separable shells, a light aperture in one of said shells, optical means carried by the other of said shells, disposed opposite to said light aperture, and adapted for the transmission of the image of the individual picture of the band to be viewed, the second mentioned shell having hollow spaces therein one upon either side of said light aperture and optical means, a removable protective casing disposed in at least one of said hollow spaces and receiving the film band, said casing having a slot therein through which said band may freely extend, the interior surfaces of said casing being so constructed and arranged as to provide contact with the film band only at the margins thereof, whereby the picture portions of said band are protected from abrasion, and means for moving the band through the device.

6. A compact portable exhibitor for the display of individual pictures on a film band and adapted to be carried in the pocket of the user, said exhibitor comprising, in combination, a housing formed of two separable shells, a light aperture in one of said shells, optical means carried by the other of said shells, disposed opposite to said light aperture, and adapted for the transmission of the image of the individual picture of the band to be viewed, the second mentioned shell having hollow spaces therein one upon either side of said light aperture and optical means, a removable protective casing disposed in at least one of said hollow spaces and receiving the film band, said casing having a slot therein through which said band may freely extend, said casing being constructed of transparent material whereby the film band may be inspected while contained therein as for the purposes of identification, means for moving the band through the device, and a transparent plate carried by the same shell in which the hollow spaces are provided and arranged between the light aperture and the optical means for guiding the portion of the film band lying between said hollow spaces.

CURT RAUCH.